United States Patent [19]
Greivenkamp, Jr.

[11] Patent Number: 4,791,584
[45] Date of Patent: Dec. 13, 1988

[54] SUB-NYQUIST INTERFEROMETRY

[75] Inventor: John E. Greivenkamp, Jr., Rochester, N.Y.

[73] Assignee: Eastman Kodak Company, Rochester, N.Y.

[21] Appl. No.: 918,951

[22] Filed: Oct. 15, 1986

[51] Int. Cl.⁴ .............................................. G01B 9/02
[52] U.S. Cl. ..................................... 364/525; 356/359; 356/360
[58] Field of Search ............... 356/349, 353, 358, 359, 356/360; 250/550; 364/525, 561, 563

[56] References Cited

U.S. PATENT DOCUMENTS

| | | | |
|---|---|---|---|
| 3,917,926 | 11/1975 | Gerard et al. | 235/92 |
| 3,936,160 | 2/1976 | Von Bieren | 356/345 |
| 4,169,980 | 10/1979 | Zanoni | 250/550 |
| 4,188,122 | 2/1980 | Massie et al. | 356/349 |
| 4,346,999 | 8/1982 | Massie | 356/349 |
| 4,583,855 | 4/1986 | Bareket | 356/351 |
| 4,594,003 | 6/1986 | Sommargren | 356/349 |
| 4,611,915 | 9/1986 | Gillard et al. | 356/358 |
| 4,624,569 | 11/1986 | Kwon | 356/354 |
| 4,639,139 | 1/1987 | Wyant et al. | 356/360 |
| 4,640,618 | 2/1987 | Tracy et al. | 356/345 |
| 4,687,332 | 8/1987 | Baveket | 356/353 |
| 4,697,927 | 10/1987 | Ono | 356/360 |

OTHER PUBLICATIONS

"Direct Phase Measurement of Aspheric Surface Contours," by K. Creath and J. C. Wyant.

Primary Examiner—Parshotam S. Lall
Assistant Examiner—Ellis B. Ramirez
Attorney, Agent, or Firm—Thomas H. Close

[57] ABSTRACT

A technique is described for extending the measurement range of interferometry past the Nyquist limit of the sampling frequency of the interferogram. The absolute phase values measured by an interferometer are reconstructed by applying constraints based upon a priori knowledge of the absolute phase values. The constraints include the knowledge that one or more derivatives of the spatial distribution of phase values is a continuous function, and the knowledge of step heights to within $\lambda/2$.

24 Claims, 9 Drawing Sheets

SUB-NYQUIST INTERFEROMETRY

TECHNICAL FIELD

The present invention relates to interferometry and more particularly to a technique for extending the useful range of interferometry beyond the conventional half wave limitation on the change in phase from sample to sample.

BACKGROUND ART

The implementation of phase-shifting or heterodyne interferometry (PSI) techniques has become well accepted for interferometric systems that are both commercially available and under development today. These systems are applied to a variety of tasks, including optical testing, surface roughness measurement, distance measurements, and dimensional gauging. The primary reason for the acceptance of the phase-shifting procedures is the extreme precision to which measurements can be made. In fact, the measurement precision of many of these instruments exceeds the calibration standards available. Other important advantages of these phase-shifting techniques over other types of interferometric measurement are the ability to collect data on a regularly spaced grid or at equal time intervals instead of only at fringe centers or zero crossings, and their general immunity to a number of noise sources.

The major limitation of the existing phase-shifting or heterodyne techniques is their inability to measure the surface profile of surfaces with large departures from a best-fit reference surface. With the advent of such techniques as single-point diamond turning, computer controlled polishing, and the molding of aspheric lenses in both plastic and glass, it has become possible to design and fabricate optical surfaces with very large aspheric departures. The existing measurement tools are unable to conveniently, economically and rapidly test the resulting surfaces or wavefronts. The reason for this limitation is that the current phase-shifting algorithm with only correctly reconstruct the wavefront if the change of the wavefront between adjacent measurement points either in space or time is a half wave or less.

Phase-shifting interferometers operate by introducing a time varying phase-shift between the reference and sample beams of an interferometer, which results in a time varying interference pattern. Synchronous detection, either digital or analog, is applied to this pattern to measure the relative phase of the wavefront at an array of sample locations. To simplify the following description, only the phase-shifting technique as applied to spatially varying wavefronts will be described. It should be clear to one skilled in the art however that the techniques described herein will also be readily applied to any of the other detection schemes.

A general expression for the intensity pattern $i(x,y,\delta)$ of an interferogram is $$i(x,y,\delta) = i'(x,y) + i''(x,y) \cos[\phi(x,y) - \delta], \quad (1)$$

where $\phi(x,y)$ is the unknown phase difference between the reference and sample wavefronts, $\delta$ is the time-varying phase shift introduced between two beams in an interferometer, and $i'(x,y)$ and $i''(x,y)$ are unknown quantities relating to a DC level and a base modulation of the intensity pattern, respectively. The phase shift $\delta$ is usually obtained by translating one of the optical elements with a piezoelectric drive, although other mechanisms exist. The detection scheme for PSI consists of recording a series of interferograms recorded for different values of the phase $\delta$. In practice, the phase shift is often allowed to vary linearly over a range $\Delta$ during each of the measurements. The $n^{th}$ sample interferogram can then be expressed by the integral $$i_n(x,y) = \frac{1}{\Delta} \int_{\delta_n - \Delta/2}^{\delta_n + \Delta/2} i(x,y,\delta) d\delta, \quad (2)$$

where $\delta_n$ is the phase shift at the center of each integration period. Substitution, integration and simplification of equation (2) yields $$i_n(x,y) = i'(x,y) + i''(x,y) \frac{\sin(\Delta/2)}{\Delta/2} \cos(\phi(x,y) - \delta_n). \quad (3)$$

The data set needed for analysis of the wavefront using PSI is a set of three or more interferograms recorded with different average phase shifts $\delta_n$. An example is the four-step algorithm where the phase is advanced in four equal steps of 90°. In this case, $$\delta_n = 0, \pi/2, \pi, 3\pi/2, \quad (4)$$

and $\Delta$ equals zero. The four recorded interferograms after trigonometric simplification are $$i_1(x,y) = i'(x,y) + i''(x,y)\cos(\phi(x,y)), \quad (5)$$
$$i_2(x,y) = i'(x,y) + i''(x,y)\sin(\phi(x,y)),$$
$$i_3(x,y) = i'(x,y) - i''(x,y)\cos(\phi(x,y)),$$
$$i_4(x,y) = i'(x,y) - i''(x,y)\sin(\phi(x,y)).$$

Combining these equations and solving for $\phi(x,y)$ gives the result $$\phi(x,y) = \tan^{-1}\left[\frac{i_2(x,y) - i_4(x,y)}{i_1(x,y) - i_3(x,y)}\right]. \quad (6)$$

This last equation is evaluated at every point in the interferogram to yield a map of the wavefront phase. The phase values can easily be converted into optical path differences (OPD's) by:

$$OPD(x,y) = \phi(x,y)\lambda/2\pi \quad (7)$$

where $\lambda$ is the wavelength of the light beam in the interferometer. If the signs of the numerator and denominator of equation (6) are determined, the phase can be calculated over a range of $2\pi$. The result of the arctangent in equation (6) is to give the phase of the wavefront modulo $2\pi$. In order for the data to be useful, any $2\pi$ phase discontinuities resulting from the arctangent must be removed. In other words the calculated wavefront returns to a value of zero every time the actual wavefront equals a multiple of $2\pi$, and this segmented or "compressed" wavefront must be reconstructed to obtain the correct absolute wavefront. This situation is shown in FIG. 3, where the line labeled W represents the absolute phase of the wavefront, and the segments labeled W' represent the phase of the wavefront modulo $2\pi$.

The procedure for removing the $2\pi$ phase discontinuities is to start at a single sample value of the wavefront, normally at the center of the interferogram, and to assume that the phase between any two adjacent samples does not change by more than $\pi$. If the phase difference calculated for two adjacent samples exceeds $\pi$, then $2\pi$ is added to or subtracted from the value of the second sample to correctly reconstruct the wavefront. The entire wavefront map is then reconstructed by working outward in this manner from the starting sample.

This method of measurement therefore places a restriction on the types of wavefronts and surfaces that can be correctly reconstructed. The condition that the phase of the wavefront changes by less than $\pi$ per sample is equivalent to restricting the slope of the wavefront to a half wave per sample (or a quarter wave per sample for a surface tested in reflection). Because of this restriction, only surfaces or wavefronts that have small departures from a best-fit reference surface can be tested. For highly aspheric surfaces, the wavefront changes too rapidly for the reconstruction algorithm to keep up with the changes.

Since a complete fringe is formed in the interferogram every time the wavefront changes by a full wave or $2\pi$, the maximum fringe frequency that can be measured is equal to half the sampling frequency of the detector recording the interferogram. According to sampling theory, if there are two samples per fringe, then it is always possible to correctly reconstruct the fringe frequency. The PSI algorithm matches this condition. The maximum allowable fringe frequency that can be reconstructed is therefore equal to the Nyquist frequency of the sensor, which is defined to be half the sampling frequency. Frequencies in the interferogram above the Nyquist frequency are aliased to a lower spatial frequency by the sensor, and the PSI reconstruction algorithm is unable to interpret this aliased data.

Because the limitations of PSI are placed on the wavefront slope and not the wavefront itself, it is not possible to predict the number of waves of asphericity that a particular interferometer configuration will be capable of measuring. However available interferometers taking approximately 200 samples across the diameter of an interferogram are typically able to measure aspheric departures of from 10 to 20 waves before the reconstruction algorithm breaks down.

Attempts to overcome this reconstruction have included the use of null lenses or computer generated holograms to reduce the degree of asphericity present in the test wavefront. Detector arrays with increased number of pixels have been used to increase the Nyquist frequency of the sensor. The use of longer wavelengths and two-wavelength techniques, and the use of light sources with limited coherence lengths have also been attempted. While these techniques do increase the measurement range of phase shifting interferometry, and allow the surface to be measured, none of them are entirely satisfying. They all involve a trade-off which either greatly increases the cost of the instrument, places long lead times in the design of the test, makes the instrument much more difficult to calibrate, or decreases the precision of the test.

It is therefore the object of the present invention to provide a technique for extending the measurement range of interferometry that is free from the drawbacks noted above with respect to the prior art.

DISCLOSURE OF THE INVENTION

The assumption used in PSI to remove the $2\pi$ discontinuities in the measured phase values of a wavefront is that the wavefront is continuous or that it does not change by more than $\frac{1}{2}$ wave or $\pi$ per sample. A simple and reasonable enhancement of this assumption to allow for the recovery of information from regions where the wavefront changes faster than $\pi$ per sample location is to use a priori knowledge about the surface under test to constrain the reconstruction. For example, when the surface under test is an optical surface, the surface is smooth. As a consequence, in addition to being continuous, the surface or wavefront will have continuous derivatives. The equation for a generalized asphere or any of the polynomial expansions, such as Zernike polynomials, used to describe a wavefront assure that this is a correct assumption for most interferometric tests of optical systems.

According to the present invention, the procedure for testing an aspheric wavefront begins by using the standard PSI techniques, including the surface continuity constraint, to obtain a first estimate of the reconstructed phase of the wavefront. This result is then placed under the additional constraint that the slope of the wavefront does not change by more than $\frac{1}{2}$ wave or $\pi$ per sample per sample. The appropriate number of $2\pi$'s are added to each sample to satisfy this condition, and there is only a single solution which produces this result. This first derivative continuity constraint places a limit on the maximum allowable second derivative of the wavefront. However, this result can be further corrected by requiring that the second derivative of the wavefront is also continuous and adding more $2\pi$'s as appropriate. This is accomplished by limiting the third derivative of the wavefront to a value of $\frac{1}{2}$ wave or $\pi$ per sample per sample per sample. This procedure can be continued to even higher order derivatives until a more fundamental resolution limit as explained below is reached. Because the technique of the present invention correctly reconstructs the wavefront with fewer samples than would be required by matching the Nyquist frequency to the maximum fringe frequency in the interferogram, it will be called sub-Nyquist interferometry (SNI).

There is one other restriction on the wavefront that is needed to implement the SNI technique for smooth surfaces. In order to calculate initial values of the various surface derivatives, there must be a small block of samples that appear in the data set with less than a $\pi$ phase change between samples in the block. A block of 2 by 2 samples is needed to implement the first derivative continuity constraint. A block of 3 by 3 samples is needed to implement the second derivative continuity constraint, etc. Actually this condition is slightly overstated. All that is actually required for implementing the $n^{th}$ derivative continuity constraint is a block of $n+1$ by $n+1$ samples that have been correctly reconstructed by the previous order reconstruction. A correct initial value of the particular derivative must be available for the reconstruction. Conveniently, the initial samples are chosen by an operator by observing an area of the interferogram where there are low-frequency high-contrast fringes. Such areas are readily identifiable by visual observation of the interferogram.

The image sensor used to sample the interferogram that is needed to implement SNI is one in which the size of the active area of each image sensing element is relatively small in relation to the element pitch. The quantity G is defined as $$G = a/x_s, \qquad (8)$$

where
a is the width of the image sensing element and
$x_s$ is the pitch of the sensing elements in the array.

The MTF of an individual image sensing element will be a sinc function (of the form sin (x)/x) with its first zero at a spatial frequency equal to the sensor sampling frequency divided by G, $1/(Gx_s)$.

A small value of G implies that the image sensing elements on the sensor are small and widely separated. This is referred to herein as a sparse array. Most conventional sensors are designed for pictoral sensing and to capture as much light as possible, and therefore have values of G generally between 0.5 and 1. The pixels in such sensors are almost contiguous. A sparse array according to the present invention is one in which G is less than 0.5 and preferably is 0.1 or less.

The frequency at which the image sensing element exhibits zero response occurs at the spatial frequency corresponding to the condition of a full fringe period fitting exactly inside an image sensing element. At this point the sensor is blind to the input as a lateral shift of the fringe pattern will not change the signal from the image sensing element. This point defines the ultimate limiting range of SNI. Since the measured figure modulation at this point is zero, the correct value of phase modulo $2\pi$ cannot be reconstructed.

The derivative continuity assumptions of SNI allow the wavefront to be reconstructed from aliased fringes out to a spatial frequency equal to the zero response frequency of the image sensing elements. This limit is a factor of 2/G greater than what is obtainable by conventional PSI, and gives the limit to the maximum wavefront or surface slope that can be tested. The power of the SNI technique now becomes apparent. For example, a 100 by 100 element detector array with G=0.1 and SNI processing techniques will have the same fringe "resolution" as a 2,000 by 2,000 element array processed with PSI, with the advantage that only the data from a 100 by 100 element array must be collected and processed. This example yields a savings of 400 or $(2/G)^2$ in data rates, memory and computations.

A more intuitive feel for the SNI technique according to the present invention can be obtained by looking at the process graphically. The result of equation (6) is to give a very precise measure of the wavefront phase modulo $2\pi$ at each sample location. The true wavefront phase will therefore be one of the solutions to $$\phi_i = \overline{\phi}_i \pm 2\pi n_i, \qquad (9)$$

where i indexes the samples, $\phi_i$ is the correct phase, $\overline{\phi}_i$ is the measured phase modulo $2\pi$, and $n_i$ is an integer. The measured values of $\phi$ are shown in FIG. 4. All of the possible solutions to equation (9) are plotted as points in FIG. 5, and the dotted line represents the actual wavefront that produced the data. The circles in FIG. 5 indicate the measured phase values modulo $2\pi$, and the +'s indicate the possible solution to equation (9). The wavefront reconstruction problem can be thought of as a "connect-the-dots" puzzle where there are many extra dots. The conventional PSI algorithm moves from sample to sample and selects the dot that is closest to the preceding dot. It fails when the correct dot is not the closest dot (i.e. when the wavefront changes by more than $\pi$ per sample location). This situation is shown in FIG. 6 where a reconstructed wavefront W according to PSI is in error after the fourth sampling location. The first derivative continuity constraint of SNI chooses the dot which most closely lines up with a line connecting the previous two dots. FIG. 7 shows the wavefront W correctly reconstructed by the SNI technique.

The first derivative constraint fails when the slope of the wavefront changes by more than $\pi$ per sample per sample. Similarly, higher order constraints according to SNI choose the next dot by extrapolating a curve that has been fit through the appropriate number of preceding dots.

Accordingly, the object of the present invention is achieved by an interferometry apparatus and method employing the technique of forming samples of an interferogram. The samples represent phase values of the wavefront modulo $2\pi$, and absolute phase values are reconstructed from the samples by adding or subtracting multiples of $2\pi$ from the sample values. A constraint based upon a priori knowledge of the absolute phase values is applied to correctly reconstruct the absolute phase values when the actual phase changes by more than $\pi$ per sample.

In a preferred embodiment, wherein the interferometry is phase-shifting interferometry and the a priori knowledge is that the phase is a function having continuous derivatives, the object of the present invention is achieved by the technique of measuring the spatial distribution of phase differences between a test beam and a reference beam of coherent monochromatic light by phase-shifting interferometry. The steps include superimposing the test beam and the reference beam to form an interference pattern, detecting the intensity of the interference pattern and generating a signal representing the intensity at a sparse array of sampling locations, displacing the relative phase of the reference beam and the test beam by fractions of a wavelength of the light, providing a starting location indicating the location of a neighborhood of sampling locations where the phase difference between the test beam and the reference beam does not change by more than $\pi$ between adjacent sampling locations in the neighborhood, and processing samples of the interference pattern detected at three or more relative phase displacements to produce samples of the phase difference at each of the sampling locations. This last step includes generating a phase difference value modulo $2\pi$ at each sampling location, and reconstructing an absolute phase value at each of the sampling locations by starting at the starting location and reconstructing the absolute phase values according to the constraints that the spatial distribution and one or more derivatives of the spatial distribution of the phase difference values is a continuous function.

MODES OF CARRYING OUT THE INVENTION

Figure 1:
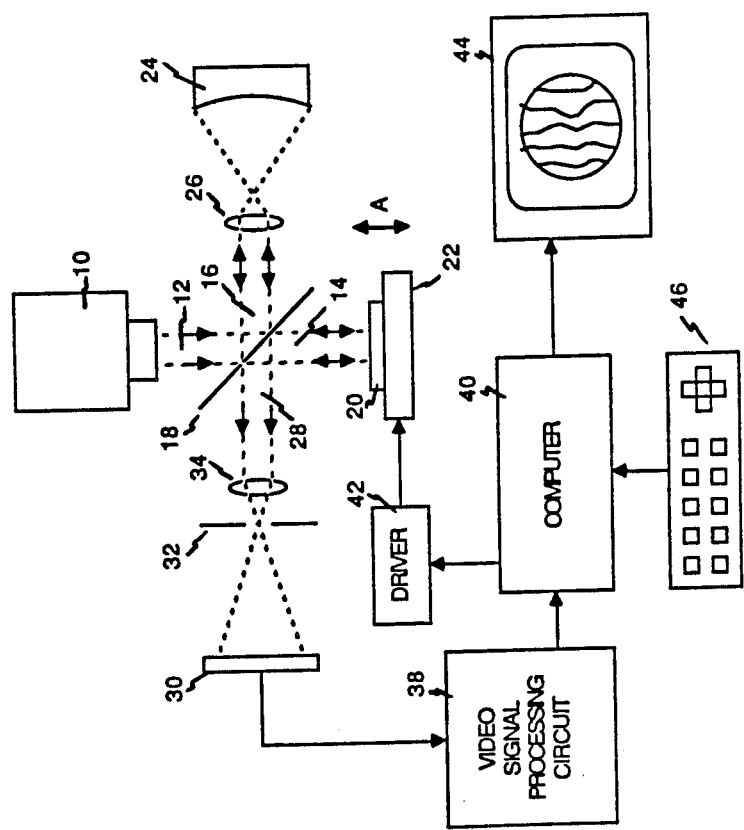
FIG. 1 is a schematic diagram of a phase-shifting interferometry apparatus useful according to the present invention.

FIG. 1 schematically shows a conventional Twyman-Green interferometer suitable for practicing the present invention. The interferometer includes a laser light source 10 that forms a beam 12 of coherent monochromatic light. The beam 12 is split into a reference beam 14 and a test beam 16 by a beam splitting mirror 18. The reference beam 14 is directed to a reflective surface 20. The reference surface is carried on a piezoelectrically activated stage 22 that can displace the reference surface 20 by fractions of a wavelength of the light beam in the direction of arrow A parallel with the axis of the light beam. The test beam 16 is directed to a test surface 24 via an expander lens 26. The reflected reference beam and test beam are combined by beam splitting mirror 18 to form a combined beam 28. The combined beam 28 is imaged onto an image sensor 30 through an aperture 32 by imaging lens 34. The combined beam 28 forms an interference pattern at the image sensor 30.

Figure 2:
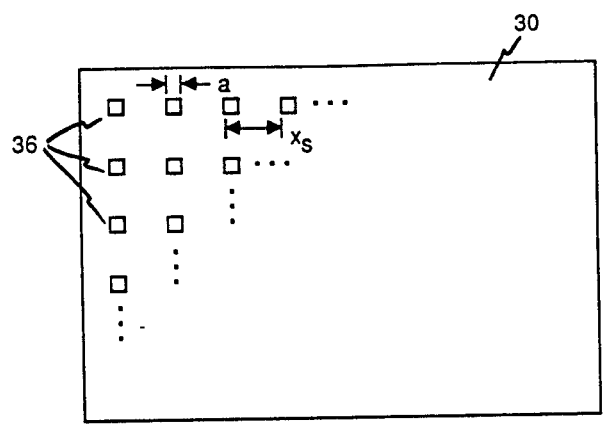
FIG. 2 is a schematic diagram illustrating a sparse array of image sensing elements employed in the interferometry apparatus of FIG. 1.
Figure 3:
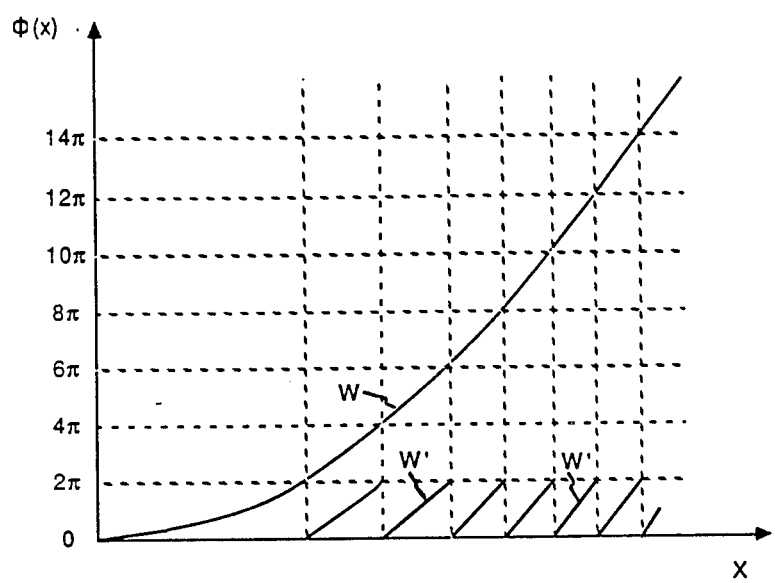
FIGS. 3-7 are graphs of phase versus distance useful in describing the operation of the present invention.
Figure 4:
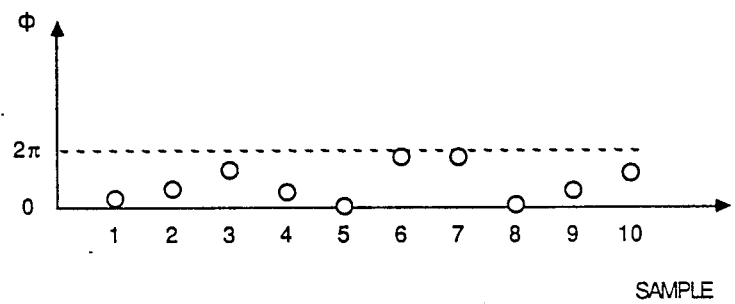
Figure 5:
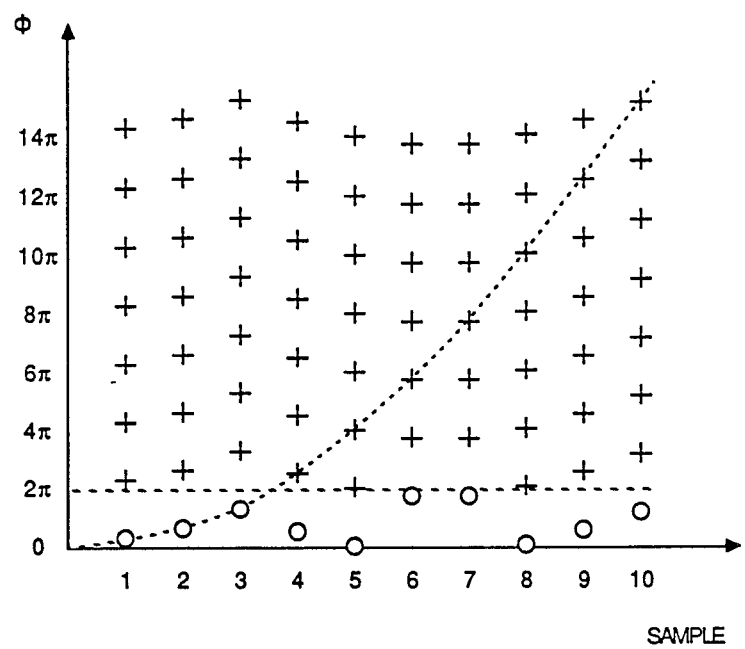
Figure 6:
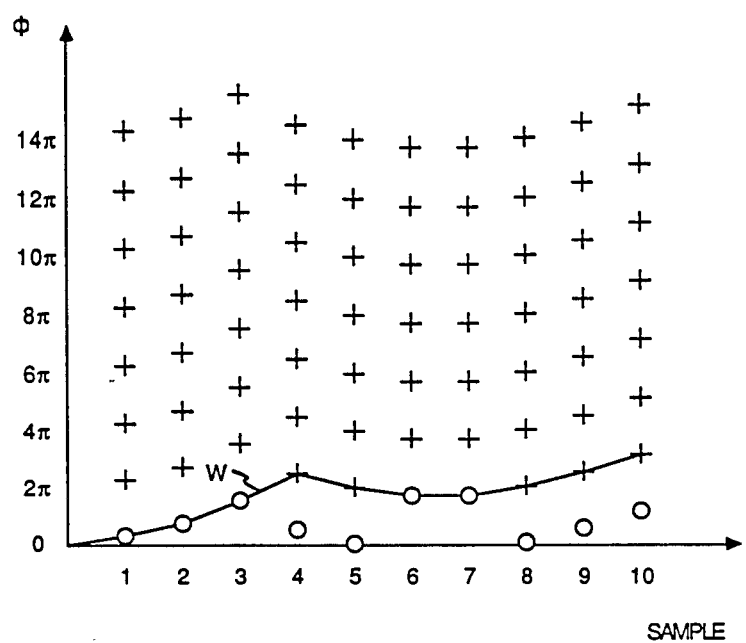
Figure 7:
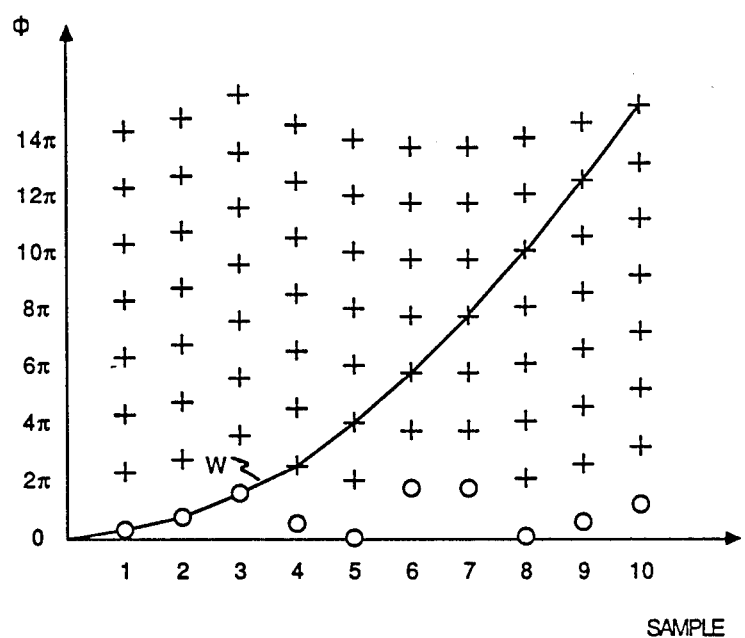

The image sensor 30 is an area array image sensor preferably having a sparse array of image sensing elements for sampling the interference pattern at a sparse array of image sampling locations. FIG. 2 shows the arrangement of image sensing elements 36 in the image sensing array 30. As shown in FIG. 2, the width a of the image sensing element is much less than the pitch $x_s$. Preferably, $G = a/x_s = 0.1$ or less.

The signals generated by the image sensing array 30 are processed by conventional video signal processing circuit 38 and sent to a digital computer 40. The digital computer 40 is programmed to control the interferometer, and to process the interferometric data received from video signal processing circuit 38 as described below. The computer 40 controls the displacement of the reference surface 20 through a driver 42. The computer can also send a video signal to a video monitor 44 to generate an image of the interference pattern, or a graph of the reconstructed test surface profile. The interferometer is controlled by an operator through a standard keyboard interface 46.

The operation of the interferometer according to the present invention shown in FIG. 1 will now be explained. The spatial distribution of irradiance $i_{1-4}(x,y)$ is sampled at four phase steps and processed according to equation (6) to yield the phase difference $\phi(x,y)$ modulo $2\pi$ at each sampling location. Next, the absolute phase difference is reconstructed by adding the proper number of $2\pi$'s between each sample in the array. The operator selects for a starting location at region of the interferogram where the phase changes by less than $\pi$ per sample (i.e. a region where there is no aliasing of the sampled image signal). Such a region is easily recognized by observation of an image of the interferogram on the video display 44 as an area having low-frequency, high-contrast fringes. The visibility of an appropriate starting location may also be enhanced by slightly displacing the image sensor horzontally with respect to the image of the interferogram, while displaying the image on the monitor. This will cause the aliased areas of the image to distort dramatically, while the unaliased areas will exhibit only a slight change. It is also possible to program the computer 40 to identify an appropriate starting location automatically by sensing the regions where the change is slight from frame to frame when the image sensor is displaced.

Figure 8A:
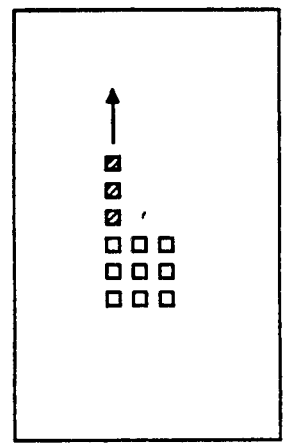
FIGS. 8a–d are schematic diagrams illustrating the reconstruction process for two-dimensional phase-shifting interferometry.
Figure 8B:
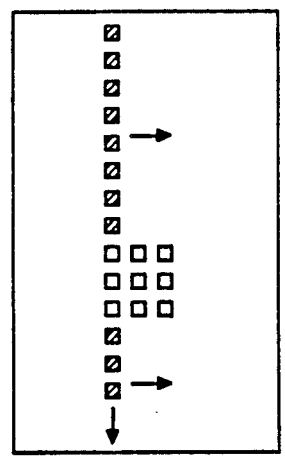
Figure 8C:
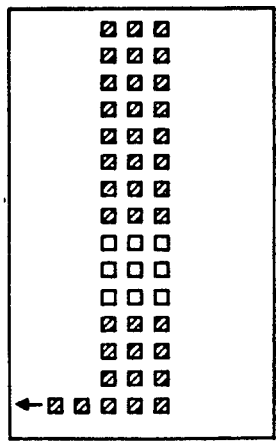
Figure 8D:
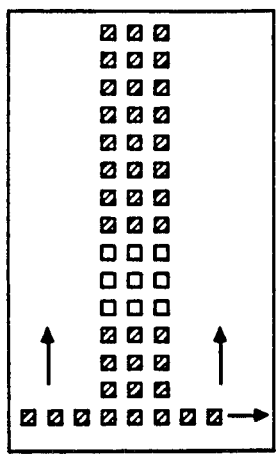

After an appropriate starting location is identified and entered into the computer, the computer reconstructs the absolute phase differences from the phase differences modulo $2\pi$ according to the following procedure. Starting at the identified starting location, the computer reconstructs a first row of absolute phase values, preceding first to the right as shown in FIG. 8a, and then to the left as shown in FIG. 8b. Three complete rows are reconstructed in this manner (two rows if only a first derivative continuity constraint is applied). The columns are then reconstructed by proceeding up the reconstructed rows as shown in FIG. 8c then down as shown as shown in FIG. 8d until the whole array of absolute phase values has been reconstructed.

A computer program written in the MICROSOFT BASIC language for operating on a MACINTOSH personal computer, for reconstructing a line of phase values from sampled phase-shifting interferometry data is included as appendix A. The lines of code have been numbered on the left for the purpose of the following description.

The remarks in the program are indicated by REM*** and are self-explanatory. Lines 42–56 of the program set up the variables to be employed in the calculation. Lines 60–66 correspond to the equations (5) above. Lines 68–70 solve the equation (6) above. Line 74–78 re-calculate the phase measurement to fall between zero and $2\pi$. Lines 82–91 reconstruct the absolute phase values using the surface continuity constraint of PSI. The output of the computer program at this point is identical of that produced by a prior art phase-shifting interferometer, and the absolute phase will fail to be properly reconstructed when the phase changes by more than $\pi$ per sample.

Lines 108–124 of the program apply the first derivative continuity constraint to the reconstructed phase values, and add additional $2\pi$ phase increments to insure the continuity of the slope (or first derivative) of the phase. This portion of the program calculates the slopes from successive pairs of phase values (line 112), and checks to see if the slope changes by more than $\pi$ per sample per sample (line 114). If the slope changes by more than $\pi$, and the slope is increasing, $2\pi$ is subtracted from all the unprocessed phase values in the row (lines 116–119). If the slope changes by more than $\pi$, and the slope if decreasing, $2\pi$ is added to all the unprocessed phase values remaining in the row (lines 120–124). At this point, the slope continuity constraint has been applied to all of the phase values in the row. The absolute phase values thus reconstructed will fail to be properly reconstructed when the phase changes by more than $\pi$ per sample per sample.

Lines 139–158 of the program apply the second derivative continuity constraint to the reconstructed phase values and add additional $2\pi$ phase increments to insure the continuity of the second derivative of the phase. This portion of the program calculates the rate of change in the slope for successive pairs of slope values (line 144) and checks to see if the change is greater than $\pi$ per sample value (line 145). If the rate of change in slope is greater than $\pi$ per sample per sample, and the rate of change is positive, $2\pi$ is subtracted from all of the unprocessed phase value in the row (lines 148-152). If the rate of change is negative, $2\pi$ is added to the unprocessed values (153-158).

At this point, all of the phase values are correctly reconstructed until the second derivative of the phase changes by more than $\pi$ per sample per sample between samples. The technique may be extended to constraints on higher order derivatives in a manner exactly analogous to the constraints on first and second derivatives. However, it has been found that reconstruction generally fails before the second derivative constraint limit is met due to the finite sample size, and not for lack of higher order constraints.

The remaining steps in the program reconstruct the wavefront from the phase values, where the conversion to obtain the wavefront departure in waves is to divide the reconstructed phase by $2\pi$, and send the values to a plotter for visual display. It will be apparent to anyone skilled in the art that the technique described in the program is readily extended to reconstruction of two-dimensional array of phase values according to the procedure outlined above with respect to FIGS. 8a-d.

EXPERIMENTAL EXAMPLE

The output of a Twyman-Green interferometer was imaged onto a 100 by 100 element image sensing array. The image sensing array having sensing elements of about 45 by 45 microns on a pitch of 60 microns. A defocused wavefront was used in the interferometer so that the wavefront error or phase difference across the interferogram varied approximately quadratically. To maximize the number of available samples, the minimum of the quadratic was located near one edge of the sensor. The amount of defocus was adjusted so that the fringe frequency at the other side of the array was just less than the Nyquist frequency of the sensor. This condition guarantees that the PSI algorithm will properly measure the wavefront when all the data is employed. A four-step phase-shifting data collection operation where the phase is allowed to vary during the measurement ($\Delta = \pi/2$) as described above was performed, and the phase of the wavefront modulo $2\pi$ was calculated at each sample location. Only one line of data was used, and a one-dimensional reconstruction across the wavefront was employed. The standard PSI assumption of surface continuity was applied to the measured data to provide a reconstruction against which to judge the SNI results.

The SNI technique was then implemented on this same data set, but using the data from every second, third, etc. pixel on the image sensor. The SNI reconstruction and the equivalent PSI reconstruction of the restricted data sets were compared. The SNI analysis correctly reproduced the G≃0.75 PSI results out to G≃0.093 where every eigth sample was used. A wavefront that required 61 samples to properly measure with PSI was correctly reproduced with eight samples in this one-dimensional example. The SNI algorithm correctly removed about three waves of ambiguity between the samples at the edge of the wavefront. The failure of the SNI algorithm at G≃0.083 (every ninth sample) occurred not because the fringes had exceeded the cutoff frequency of the image sensing elements, but rather because there was not a proper starting location where the phase varied by less than $\pi$ per sample for the reproduction algorithm. Both SNI and PSI were seen to fail at the third sample at G≃0.083.

Figure 9:
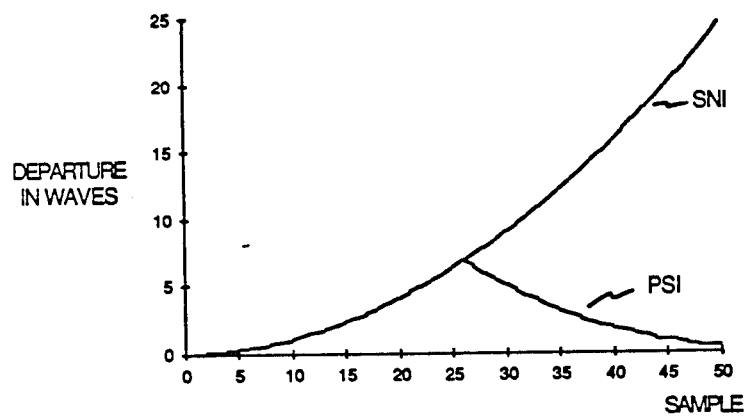
FIG. 9 is a graph illustrating the output of an example of the present invention.

In a similar manner, the measurement range of this same interferometer was extended by the use of SNI. The defocus of the wavefront was increased so that the fringes were aliased by the sensor. Phase-shifting data was collected and analyzed using SNI with first and second derivative continuity constraints as described above. These results are shown in FIG. 9, were the curve labeled SNI represents the correctly reconstructed wavefront. For purposes of comparison, the wavefront reconstructed by the prior art PSI technique is also shown in FIG. 9 and labeled PSI. An improvement of a factor of about 3.5 in the measurement range of the sensor by employing SNI was recorded in this experiment. The failure of the SNI reconstruction was not due to exceeding the continuity constraints, but rather because the fringe frequency approached the first zero of the MTF of the sample aperture. In fact, the modulation of the data used to calculate the phase modulo $2\pi$ was monitored to determine when this condition occurred, and the data was designated as invalid and the reconstruction was stopped when the modulation fell below some predetermined value. As mentioned earlier, this point is the ultimate limit on the maximum fringe frequency or wavefront slope that can be measured by SNI.

The technique of the present invention is readily adapted to other kinds of a priori information about the surface under test. For example, information about the height of a step on a surface that has been obtained by another measurement technique or even through process parameters, such as an etch rate, may be used to resolve the half-wave height ambiguity that results from an interferometric measurement in reflection. This information must give the height measurement to within a range of a half wave. An interferometric test will give the step height as a number between zero and a half wave ($\lambda/2$), and the actual height h is $$h = h_o + n\lambda/2, \qquad (9)$$

wherein $h_o$ is measured height, and n is an integer. The application of the information from the other measurement will select a single value of n, and result in an accurate measure of the height. This situation is diagrammed in FIG. 10. The step height h is known to within less than $\lambda/s$. The possible range for the step height is shown by the cross hatched region in the figure. The dots represent the possible solutions to equation 9 for n=0,1,2, etc., and the dot that falls within the cross hatched region is the actual solution. A program for implementing this constraint in an interferometer of the type shown in FIG. 1 can be easily written by one of ordinary skill in the art. No special sensor configuration is needed for this measurement, and the precision of the measurement is the same as the precision of the phase-shifting interferometer, which has been demonstrated to be $\lambda/100$ to $\lambda1000$ or better. The only requirement is that the step height must be known ahead of time to within less than a half wave of the actual value.

INDUSTRIAL APPLICABILITY AND ADVANTAGES

The present invention is useful in the field of interferometry. It is advantageous in that the measurement range of existing interferometers can be extended by factors of 2 to 4 by applying the technique of the present invention, and the measurement range of interferometers specially constructed to practice the present invention is improved by orders of magnitude over the prior art.

APPENDIX A

```
REM***This program simulates, in one dimension,
REM***   the data obtained from a phase-shifting
REM***   interferometer to allow the demonstration
REM***   of Sub-Nyquist Interferometry.
REM***
REM***This version of the program allows for
REM***   detector samples of finite size. To
REM***   simplify the analysis, the fringe
REM***   frequency (wavefront slope) will be
REM***   assumed to be constant over the sample,
REM***   and this frequency will be determined from
REM***   the calculated wavefront slope.
REM***The variable G is the sample width-to-pitch
REM***   ratio.
REM***
REM***This analysis assumes no noise.
REM***
REM***The index N counts the samples.
REM***Ntotal is the total number of samples.
REM***Height gives the wavefront height in
REM***   microns as a function of N.
REM***Slope gives the slope of the wavefront in
REM***   fringes per sample.
REM***Phase gives the absolute phase height of the
REM***   wavefront.
REM***PhMeas is the phase calculated from the
REM***   interferogram.
REM***PhRec is the reconstructed phase of the
REM***   wavefront (remove 2*Pi discontinuities).
REM***CalcS1 is the wavefront slope calculated
REM***   from the reconstructed phase in
REM***   rad/sample.
REM***PhSN1 is the wavefront calculated using the
REM***   Sub-Nyquist technique with slope
REM***   continuity.
REM***DerS1 is the calculated derivative of the
REM***   wavefront slope in rad/sample/sample.
REM***PhSN2 is the wavefront calculated using the
REM***   Sub-Nyquist technique with second
REM***   derivative continuity.
REM***
DIM Height(1000),Slope(1000),Phase(1000),
DIM PhMeas(1000),PhRec(1000),CalcS1(1000),
DIM PhSN1(1000),DerS1(1000),PhSN2(1000)
Wavelength=.5
Pi=3.141592654#
Ntotal=50
G=.1
Slope(0)=0
FOR N=0 TO Ntotal+1
    Height(N)=.0015*N3
    Phase(N)=2*Pi*Height(N)/Wavelength
NEXT N
FOR N=1 TO Ntotal
    Slope(N)=(Height(N+1)-Height(N-1))/(2*Wavelength)
NEXT N
REM***
REM***Calculate the interferogram intensities.
REM***
FOR N=0 TO Ntotal
    IF Slope(N)=0 THEN Sinc=1 ELSE Sinc=SIN(Pi*G*
        SLOPE(N))/(Pi*G*Slope(N))
    A=1+Sinc*COS(Phase(N))
    B=1-Sinc*SIN(Phase(N))
    C=1-Sinc*COS(Phase(N))
    D=1+Sinc*SIN(Phase(N))
    REM***Calculate the measured phase PhMeas
    E=D-B
    F=A-C
    PhMeas(N)=ATN((E)/(F))
    REM***Determine the quadrant of the phase and
              re-calculate it to fall between between 0 AND
              2*Pi
    IF E>=0 and F>=0 GOTO 100
    IF F<0 THEN PhMeas(N)=Pi+PhMeas(N): GOTO 100
    IF E<0 AND F>=0 THEN PhMeas(N)=2*Pi+PhMeas(N):
              GOTO 100
100 NEXT N
```

-continued

APPENDIX A

```
REM***
REM***Remove 2*pi phase discontinuities
REM***
M=0
PhRec(0)=PhMeas(0)
FOR N=1 TO Ntotal
    IF ABS(PhMeas(N)-PhMeas(N-1))<=Pi GOTO 200
    IF ABS(PhMeas(N-1)-Pi-PhMeas(N))<Pi THEN
              M=M+1:GOTO 200
    IF ABS(PhMeas(N)-Pi-PhMeas(N-1))< Pi THEN
              M=M-1:GOTO 200
200 PhRec(N)=M*2*Pi+PhMeas(N)
NEXT N
REM***
REM***All of the calculations to this point are
REM***   standard phase-shifting interferometry.
REM***   The reconstructed phase is in error when
REM***   the wavefront slope exceeds ½ wave per
REM***   sample.
REM***The first step in the Sub-Nyquist
REM***   Interferometry procedure is to calculate
REM***   the measured wavefront slope and to add
REM***   additional 2*pi phase steps (i.e.,
REM***   increment M in line 200 above) to provide
REM***   for the continuity of this slope. The
REM***   important assumption at this point is
REM***   that the first two data points are
REM***   correctly measured (unaliased).
REM***
CalcS1(1)=PhRec(1)-PhRec(0)
FOR N=0 TO Ntotal
    PhSN1(N)=PhRec(N)
    NEXT N
FOR N=2 TO Ntotal
250 CalcS1(N)=PhSN1(N)-PhSN1(N-1)
    IF ABS(CalcS1(N)-CalcS1(N-1))<=Pi GOTO 300
    IF CalcS1(N)-CalcS1(N-1)>0 GOTO 260
    GOTO 270
FOR L=N TO Ntotal
              PhSN1(L)=PhSN1(L)-2*Pi
              NEXT L
              GOTO 250
270 FOR L=N TO Ntotal
              PhSN1(L)=PhSN1(L)+2*Pi
              NEXT L
              GOTO 250
300 NEXT N
REM***
REM***The slope continuity approach is successful
REM***   until the slope of the wavefront changes
REM***   by more than ½ wave/sample between
REM***   samples. The next extension of the
REM***   technique is to require the second
REM***   derivative of the wavefront to also be
REM***   continuous.
REM***
REM***The assumption for this analysis is that the
REM***   first three data points are good so that
REM***   the initial second derivative may be
REM***   calculated.
REM***
DerS1(2)=CalcS1(2)-CalcS1(1)
FOR N=0 TO Ntotal
    PhSN2(N)=PhSN1(N)
    NEXT N
FOR N=3 TO Ntotal
350 DerS1(N)=CalcS1(N)-CalcS1(N-1)
    ABS(DerS1(N)-DerS1(N-1))<Pi GOTO 400
    IF DerS1(N)-DerS1(N-1)>0 GOTO 360
    GOTO 370
360 FOR L=N Ntotal
              PhSN2(L)=PhSN2(L)-2*Pi
              CalcS1(L)=PhSN2(L)-PhSN2(L-1)
              NEXT L
              GOTO 350
370 FOR L=N TO Ntotal
              PhSN2(L)=PhSN2(L)+2*Pi
              CalcS1(L)=PhSN2(L)-PhSN2(L-1)
              NEXT L
              GOTO 350
400 NEXT N
```

APPENDIX A
-continued

```
REM***
REM***The data reduction is now successful until
REM***   the second derivative of the wavefront
REM***   changes by more than ½ wave/sample/
REM***   sample between samples. It should be
REM***   clear that the technique can be easily
REM***   extended to higher order derivatives.
REM***
REM***Convert the phase values from radians into
REM***   waves. The four variables defined below
REM***   correspond to the four phase variables
REM***   above.
REM***
DIM WaveFr(1000),WavRec(1000),WavSN1(1000),
DIM WavSN2(1000)
FOR N=0 TO Ntotal
    WaveFr(N)=Phase(N)/(2*Pi)
    WaveRec(N)=PhRec(N)/(2*Pi)
    WavSN1(N)=PhSN1(N)/(2*Pi)
    WavSN2(N)=PhSN2(N)/(2*Pi)
    NEXT N
REM***
REM***Write the data to the clipboard for transfer
REM***   to a plotting routine.
REM***
OPEN "CLIP:" FOR OUTPUT AS #1
    FOR N=TO Ntotal
    WRITE #1,WaveFr(N),WavRec(N),WavSN1(N),
    WavSN2(N)
    NEXT N
CLOSE #1
REM***
REM***Print the output.
REM***
LPRINT CHR$(12)
LPRINT THE PIXEL WIDTH-TO-PITCH RATIO IS";:
    LPRINT USING"#.###";G
LPRINT CHR$(13)
LPRINT"PIXEL SURFACE SLOPE WAVE-
FRONT STANDARD
LPRINT"SLOPE  2nd DERIVATIVE"
LPRINT"MICRONS ACTUAL   ANALYSIS
CONTINUITY
LPRINT"CONTINUITY"
LPRINT CHR$(13)
FOR N=0 TO Ntotal
    LPRINT USING " ###";N;:LPRINT USING " #####.
    #### ";Height(N),Slope(N),WaveFr(N),WavRec(N),
WavSN1(N),WavSN2(N)
    NEXT N
END
```

I claim:

1. A method of surface measurement interferometry, comprising the steps of:
   a. generating a first beam of coherent light;
   b. generating a second beam of coherent light;
   c. combining the first and second beams to form a interferogram;
   d. measuring the phase of the interferogram at a plurality of sampling locations to form samples of the interferogram, said samples representing phase values modulo $2\pi$; and
   e. reconstructing (i.e. removing $2\pi$ phase discontinuities to produce) absolute phase values from said samples by adding to or subtracting from said samples multiples of $2\pi$, including the step of applying a constraint based upon a priori knowledge of the absolute phase values to correctly reconstruct the absolute phase values when the absolute phase changes by more than $\pi$ per sample.

2. The method of interferometry claimed in claim 1, wherein said a priori knowledge is that the phase values have continuous derivatives, and that there is a region in the interferogram where the absolute phase changes by less than $\pi$ per sample, and further including the step of starting said step of reconstructing absolute phase values in said region.

3. The method of interferometry claimed in claim 1, wherein said a priori knowledge is the location of a step discontinuity in the interferogram, and the absolute value of the step is known to within less than $\pi$.

4. The method of interferometry claimed in claim 1, wherein the method is phase-shifting interferometry.

5. Apparatus for performing surface measurement interferometry, comprising:
   a. means for forming an interferogram;
   b. means for sampling phase values modulo $2\pi$ of the interferogram at an array of sampling locations;
   c. means for reconstructing (i.e. removing $2\pi$ phase discontinuities to produce) absolute phase values from said phase values modulo $2\pi$ by adding or subtracting multiples of $2\pi$, including means for constraining the reconstruction of said absolute phase values based upon a priori knowledge of the absolute phase values such that the absolute phase values are correctly reconstructed when the absolute phase changes by more than $\pi$ per sample location.

6. The apparatus claimed in claim 5, wherein said a priori knowledge is the knowledge that the phase values are represented by a function having continuous derivatives, and that there is a region in the interferogram where the phase changes by less than $\pi$ per sample location, and said reconstructing means beginning said reconstruction at said region, and proceeding outwardly therefrom.

7. the apparatus claimed in claim 6, including means for displaying said interferogram, and means for generating a signal representing a region on said display where the interferogram is free from aliasing, said signal being supplied to said reconstructing means for indicating said starting location.

8. The apparatus claimed in claim 5, wherein said a priori knowledge is the knowledge of the location and height of a step discontinuity in phase to within less than $\pi$.

9. The apparatus claimed in claim 5, wherein said apparatus is a phase shifting interferometer and said means for sampling the phase values modulo $2\pi$ is a sparse array of image sensing elements having $g=a/x_x$ less than 0.5, where a is the width of the image sensing elements and $x_s$ is the pitch.

10. The apparatus claimed in claim 9 wherein G=0.1.

11. Apparatus for measuring the spatial distribution of phase differences between a test beam and a reference beam of coherent monochromatic light by phase-shifting interferometry, comprising:
   a. means for superposing the test beam and reference beam to form an interference pattern;
   b. means for detecting the intensity of the interference pattern and for generating signals representing the intensity of the interference pattern at a sparse array of sampling locations;
   c. means for displacing the relative phase of the reference beam and the test beam by fractions of a wavelength of the light;
   d. means for providing a starting location signal indicating a neighborhood of sampling locations where the phase between the test beam and the reference beam does not change by more than $\pi$ between adjacent sampling locations in the neighborhood; and e. signal processing means connected to said detecting means and said starting location signal providing means and responsive to the starting location signal and the signals representing the intensity of the interference pattern detected at three or more relative phase displacements to produce a signal representing the absolute phase values of said interference pattern at each of said sampling locations, said signal processing means including,
  (1) means responsive to the signals representing the intensity of the interference pattern detected at three or more relative phase displacements for generating signals representing phase values modulo $2\pi$ at each sampling location, and
  (2) means connected to said means for generating signals representing phase values modulo $2\pi$ responsive to the signals representing phase values modulo $2\pi$ for reconstructing (i.e. removing $2\pi$ phase discontinuities to produce) an absolute phase value at each of said sampling locations, said reconstructing means starting said reconstruction at said starting location, and reconstructing said absolute phase values according to the constraints that the spatial distribution and one or more derivatives of the spatial distribution of the phase values are continuous functions.

12. The apparatus claimed in claim 11, wherein said detecting means comprises a rectangular area array image sensor having a sparse array of image sensing elements.

13. The apparatus claimed in claim 12, wherein said image sensing array is characterized by $G=a/x_s=0.1$ where a is the width of said image sensing elements in said array and $x_s$ is the pitch of elements in the array.

14. The apparatus claimed in claim 11, wherein said detecting means comprises a rectangular area array image sensor having an overlying mask defining a sparse array of apertures.

15. The apparatus claimed in claim 14, wherein said array of apertures is characterized by $G=a/x_s=0.1$ where a is the width of one of said apertures, and $x_s$ is the pitch of apertures in the array.

16. The apparatus claimed in claim 11, wherein said apparatus comprises a Twyman-Green interferometer including a test surface and a reference surface for generating said test beam and said reference beam respectively, and said means for displacing the relative phase of the reference beam includes a piezoelectric driver for displacing said reference surface.

17. The apparatus claimed in claim 11, wherein said signal processing means comprises a digital computer.

18. The apparatus claimed in claim 17, further comprising means for generating a visual display of said interference pattern, and said means for providing a starting location signal comprising means for entering data representing the x,y coordinates of a selected region of said visual display into said digital computer.

19. The apparatus claimed in claim 11, wherein the intensity of the interference pattern is displaced and detected at four relative phase displacements separated by equal steps of $\pi/2$, and the means for generating a phase value modulo $2\pi$ solves the following equation:

$$\phi(x,y) = \tan^{-1}\left[\frac{i_2(x,y) - i_4(x,y)}{i_1(x,y) - i_3(x,y)}\right]$$

where
  $\phi(x,y)$ is the phase value modulo $2\pi$ at sampling location (x,y), and
  $i_n(x,y)$ is the measured intensity for the $n^{th}$ phase displacement at sampling location (x,y).

20. The apparatus claimed in claim 19, wherein said means for reconstructing absolute phase values from phase values modulo $2\pi$ reconstructs two or more adjacent rows (or columns) having samples in the neighborhood of the starting location, then reconstructs the columns (or rows) of values from the values in the two or more reconstructed adjacent rows (or columns).

21. A method of measuring the spatial distribution of phase differences between a test beam and a reference beam of coherent monnochromatic light by phase-shifting interferometry, comprising:
  a. superposing the test beam and the reference beam to form an interference pattern;
  b. detecting the intensity of the interference pattern at a sparse array of sampling locations for three or more relative phase displacements between the reference beam and the test beam;
  c. determining a neighborhood of sampling locations where the phase difference between the test beam and the reference beam does not change by more than $\pi$ between adjacent sampling locations in the neighborhood; processing the intensity values to generate a phase value modulo $2\pi$ at each sampling location; and
  d. reconstructing (i.e. removing $2\pi$ phase discontinuities to produce) absolute phase values from said phase values modulo $2\pi$ starting at said starting location and reconstructing said absolute phase values according to the constraint that the spatial distribution and one or more derivatives of the spatial distribution of the phase values are continuous functions.

22. The method claimed in claim 21, wherein said sparse array of sampling locations is characterized by:

$$G=a/x_s=0.1$$

where
  a is the width of a sample and $x_s$ is the pitch of samples in the array.

23. The method claimed in claim 21, wherein the intensity of the interference pattern is detected at four relative phases separated by equal steps of $\pi/2$, and the phase difference values modulo $2\pi$ are generated by solving the following equation:

$$\phi(x,y) = \tan^{-1}\left[\frac{i_2(x,y) - i_4(x,y)}{i_1(x,y) - i_3(x,y)}\right]$$

where
  $\phi(x,y)$ is the phase difference modulo $2\pi$ at sampling location (x,y) and
  $i_n(x,y)$ is the measured intensity for the $n^{th}$ phase displacement at sampling location (x,y).

24. Apparatus for performing phase-shifting interferometry wherein an array of phase values modulo $2\pi$ are processed to reconstruct an array of absolute phase values by removing $2\pi$ phase discontinuities from the phase values modulo $2\pi$ according to the constraint that the phase values represent a continuous function, characterized by:

the array of phase values being generated from a sparsely sampled interference fringe intensity pattern, and said absolute phase values being reconstructed according to the further constraint that the first and/or higher derivatives of the array of phase values represent a continuous functions, and said reconstruction originating at a location in a neighborhood of the array where the difference in phase from one sampling location to the next is less than $\pi$.

* * * * *

UNITED STATES PATENT AND TRADEMARK OFFICE
CERTIFICATE OF CORRECTION

PATENT NO. : 4,791,584
DATED : December 13, 1988
INVENTOR(S) : John E. Greivenkamp, Jr.

Figure 10:
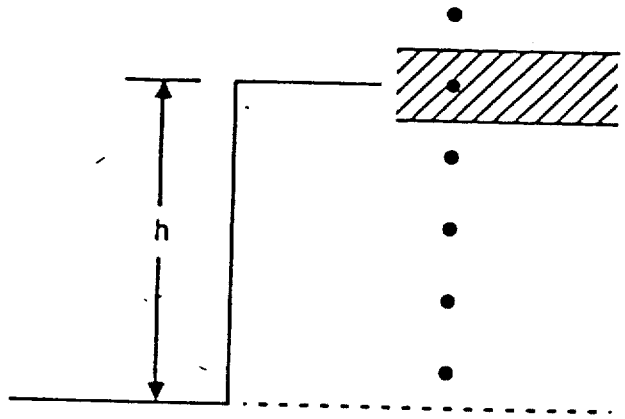
FIG. 10 is a graph illustrating the application of the technique of the present invention to a discontinuous wavefront.

It is certified that error appears in the above-identified patent and that said Letters Patent is hereby corrected as shown below:

Please add Sheet 10 of 10 - - Fig. 10 - -.

Column 14, line 47, "$g = a/x_x$" should read - - $G = a/x_s$ - -.

Signed and Sealed this

Fourth Day of July, 1989

Attest:

DONALD J. QUIGG

Attesting Officer

Commissioner of Patents and Trademarks